Figure 1:
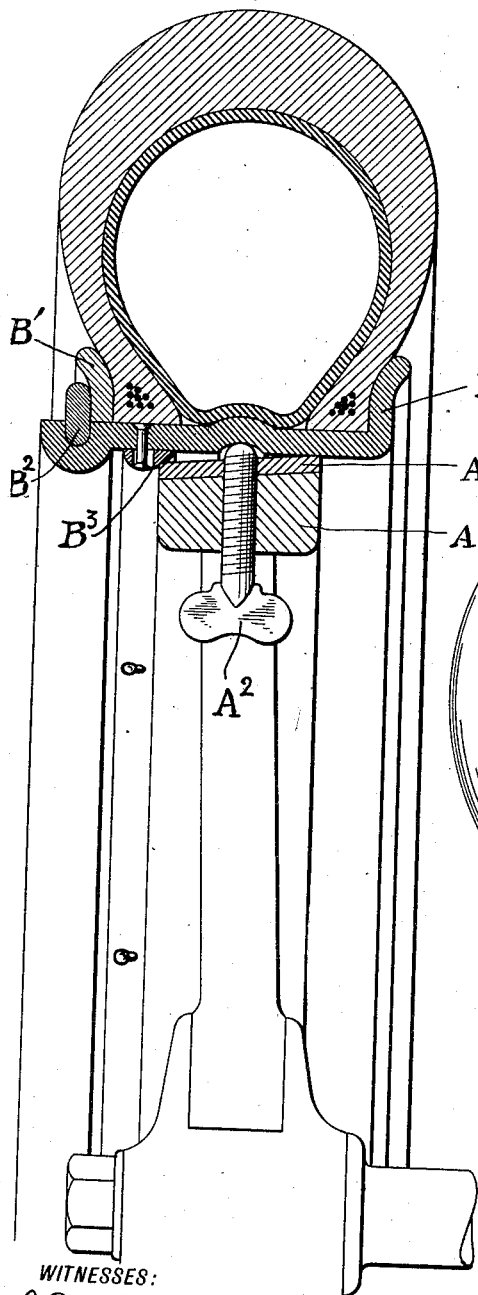

R. P. SCOTT.
DEMOUNTABLE RIM AND TIRE.
APPLICATION FILED JUNE 15, 1909.

1,009,103.

Patented Nov. 21, 1911.

WITNESSES:

INVENTOR
Robert P. Scott
BY
Lyons & Bissing
ATTORNEY

UNITED STATES PATENT OFFICE.

ROBERT P. SCOTT, OF CADIZ, OHIO.

DEMOUNTABLE RIM AND TIRE.

1,009,103.  Specification of Letters Patent.  Patented Nov. 21, 1911.

Application filed June 15, 1909. Serial No. 502,250.

*To all whom it may concern:*

Be it known that I, ROBERT P. SCOTT, a citizen of the United States, and resident of Cadiz, Harrison county, Ohio, (whose post-office address is Cadiz, Ohio,) have invented a new and useful Improvement in Demountable Rims and Tires, of which the following is a specification.

My invention relates to the so-called demountable pneumatic rims and tires where the automobilist carries a spare tire in an inflated condition on a spare wheel rim, which inflated tire and rim may bodily replace the tire and rim on the wheel in case of a puncture without the necessity of pumping-up on the road.

It has heretofore been proposed to use a wheel rim, which may be transversely or longitudinally split, or provided with removable flanges, or otherwise arranged to make possible the attachment or detachment of a pneumatic tire, and to slide such rim provided with an inflated tire transversely onto the wheel felly. To make as easy as possible the operation of sliding the rim supplied with a tire onto and off the felly, the sliding surfaces have sometimes been coned. Nevertheless despite this and other expedients to secure ready demountability in this transversely sliding class of rims, it has been found that the mud and dirt, which gather in the joints, cause parts which are readily movable in the shop to clog and stick on the road and to there seriously interfere with the demounting operation. The desideratum, however, is a road-side and not a shop demountability.

My invention attains road-side demountability by making the rim cylindric and the felly coned so that the rim and felly contact along one edge but are out of contact at the opposite edge. The clear space thus made between rim and felly I close by an annular band or wedge-ring attached to the rim. In this manner, even though the parts are clogged with mud, a slight blow with a hammer on the rim on the side opposite the clear space between rim and felly will successfully detach the rim from the felly.

One advantage of my rim is that I may employ the usual radially arranged or inwardly extending valve-stem on the tire which passes through a radial aperture in the felly. For it is seen at once that, with such inwardly extending or radial valve stem, it will merely be necessary in order to demount the tire, to dislodge the rim from the felly at the point diametrically opposite the valve. This action is possible because the clear space between rim and felly permits a turning motion of the plane of the rim with respect to the plane of the wheel about an axis represented by a tangent to the circumference of the wheel felly at the point marked by the valve-stem. But as soon as the rim is free of the felly at the point opposite the valve, the rim with its tire and valve-stem can be lifted off the wheel felly.

Another feature of my invention consists in arranging matters so that the annular band or wedge-ring on the rim lies on that face of the wheel rim which is farthest removed or away from the vehicle which I call the front face. Since any pronounced lateral strain caused by having the vehicle turn corners, which would tend to force the rim from the wheel felly, is toward the vehicle, the wedge-ring thus acts as a rim-flange or abutment pressing against the felly-band, preventing motion of the rim on the felly toward the vehicle, and the consequent dislodgment of the rim.

In order to further secure the wheel rim to the felly in a manner which shall be secure but which will not interfere with ready demountability, I provide the wheel rim with an outwardly extending groove or series of outwardly extending grooves or depressions, and I provide the wheel felly with outwardly projecting or radially arranged screws which take into the depressions. It thus becomes evident that it is the work of a moment to loosen the screws and to knock off the rim in case the tire thereon becomes deflated; and that the operation of mounting a spare rim with an inflated tire on the wheel felly is equally simple. It will thus be seen these screws are one form of securing device which I may employ for preventing lateral displacement of the rim with respect to the felly, which is another way of saying that they secure the rim to the felly.

As I have indicated above, the manner of constructing the rim to secure tire-attachability thereto forms no part of my present invention. Whether the rim is of the clencher type, or is split, or is supplied with removable flanges, is immaterial. To illustrate my invention, I have selected the removable flange type of rim.

Figure 2:
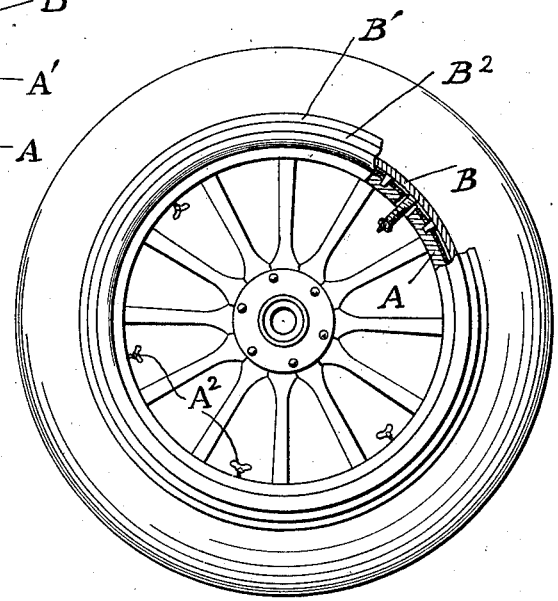

In the drawings,—Figure 1 shows a cross-section of a wheel rim and tire embodying my invention; and Fig. 2 is a side elevation partly in section of this wheel rim.

The coned, wooden felly A has secured thereto the steel felly band A', which is also made a cone-shape, and the outwardly projecting screws $A^2$ pass through the felly A and thread into the felly band A'. The wheel will be placed on the shaft of the vehicle so that the small circular base of the cone comes to the front. The steel rim B is cylindrical and has a removable flange B' held in place by a locking-ring $B^2$. Since the object of this invention is to secure ready demountability, it will be understood that the fit between the inner cylindrical face of the rim and the larger or rear circular base of the cone of the felly will not be a tight or a ground fit but a more or less loose fit. Secured to the inner, front side of the rim B, by riveting or otherwise, is a wedge-ring $B^3$, which hides and closes the open joint between the rim and wheel felly at the front, but which mainly acts to prevent the wheel rim from being forced off the felly by motion to the right in Fig. 1, that is by motion toward the vehicle. Since the lateral strains which tend to force the rim from the wheel felly, caused by having the vehicle turn corners, is toward the vehicle, this wedge-ring $B^3$, in the natural operation of attaching the rim to the wheel while this is in place on the vehicle, comes in the proper position to prevent the rim from being forced from the wheel; that is it comes on the front side of the wheel. The valve-stem which passes through an aperture in the felly may be of the usual radial type.

A very efficient manner of holding the band $B^3$, which is preferably beveled to form a wedge to the rim, is by rivets passing through slightly elongated transverse slots in the band, which rivets hold the band friction tight to the rim. The band will be adjusted for standard size rims and fellies at the factory by fastening the rivets, friction tight, to fix the band $B^3$ in proper position. If, however, there is a variation from standard, due to faulty manufacture, it will be easy to tap the band $B^3$ toward or away from the felly with a hammer and if necessary to further tighten the rivets. So, too, it will be easy to save one or two screws by using pins on the rims entering apertures in the fellies. These pins may be tapered and must not be placed far enough apart to prevent the rim with its valve stem and pins from being lifted, radially away from the felly.

The operation will now be clear.

In order to attach the tire to the rim, it is merely necessary to remove the split locking-ring $B^2$ and the removable rim-flange B'. The tire, which in the case shown is of the inextensible edge type, is now placed on the rim, the rim-flange B' is put in position, the locking-ring $B^2$ is sprung into place, and the tire is inflated. We now have a spare rim and inflated tire which may be carried on the vehicle in its journey. As before stated, other means than the removable flange B' and the locking-ring may be adopted to secure ready attachability of the tire to the rim.

Should one of the tires of the vehicle become deflated, the screws $A^2$ of the rim on the vehicle are quickly operated to release them from contact with the outwardly extending depressions of the wheel rim. Because of the pronounced coning of the felly, rendered possible by the flange $B^3$, the rim readily comes off the felly at the point opposite the valve stem. The part of the rim carrying the valve-stem, which may be of the usual inwardly extending type, may now be lifted out of its aperture in the wheel felly, which is thereupon in condition to have placed thereon the spare rim and inflated tire by an operation the reverse of that described.

I claim,—

1. A demountable rim and wheel structure comprising a coned wheel felly, a plain, frusto-conical band embracing the felly, a cylindrical wheel rim carrying a removable, pneumatic tire fitted to slide over the larger base of the frusto-cone but forming a clear space at the smaller base, and securing devices for preventing lateral displacement of the rim and felly, substantially as described.

2. A demountable rim and wheel structure comprising a coned wheel felly, a plain, frusto-conical band embracing the felly, a cylindrical wheel rim carrying a removable pneumatic tire fitted to slide over the larger base of the frusto-cone, and a wedge-ring secured to the inner face of the rim bearing against the felly-band to close the open joint between the rim and felly, substantially as described.

3. A demountable rim and wheel structure comprising a coned wheel felly; a plain, frusto-conical band embracing the felly; a cylindrical wheel rim, provided with depressions, carrying a removable pneumatic tire sliding over the larger base of the frusto-cone; a wedge-ring secured to the inner, front face of the rim bearing against the felly band to close the open joint between the rim and felly; and outwardly projecting screws in the wheel felly engaging with the rim depressions, substantially as described.

4. A demountable rim and wheel structure comprising a coned wheel felly, a plain, frusto-conical band embracing the felly, a cylindrical wheel rim carrying a removable pneumatic tire fitted to slide over the larger base of the frusto-cone, and a wedge-ring secured to the inner face of the rim bearing against the felly-band along a circumferential line to close the open joint between the rim and felly, substantially as described.

In testimony whereof I have signed my name to this specification in the presence of two subscribing witnesses.

ROBERT P. SCOTT.

Witnesses:
JOHN R. SMITH,
N. LETZLEFF.